(12) United States Patent
Lefere

(10) Patent No.: US 8,888,138 B2
(45) Date of Patent: Nov. 18, 2014

(54) HOSE COUPLING

(75) Inventor: Robert Michael Lefere, Jackson, MI (US)

(73) Assignee: Eaton Corporation, Cleveland, OH (US)

( * ) Notice: Subject to any disclaimer, the term of this patent is extended or adjusted under 35 U.S.C. 154(b) by 976 days.

(21) Appl. No.: 12/724,201

(22) Filed: Mar. 15, 2010

(65) Prior Publication Data

US 2011/0221184 A1  Sep. 15, 2011

(51) Int. Cl.
*F16L 17/00* (2006.01)
*F16L 33/207* (2006.01)

(52) U.S. Cl.
CPC .................................. *F16L 33/2073* (2013.01)
USPC .......................................... 285/109; 285/242

(58) Field of Classification Search
USPC ........................... 285/109, 256–259, 242–251
See application file for complete search history.

(56) References Cited

U.S. PATENT DOCUMENTS

| 863,745 | A | * | 8/1907 | Nelson et al. ............... 285/222.3 |
| RE20,629 | E | * | 1/1938 | Eisenman ..................... 285/256 |
| 2,273,398 | A | * | 2/1942 | Couty et al. ............... 285/222.3 |
| 2,749,150 | A | * | 6/1956 | Kaiser ........................... 285/251 |
| 3,858,910 | A | * | 1/1975 | Oetiker ............................ 285/84 |
| 3,990,729 | A | * | 11/1976 | Szentmihaly et al. ........ 285/109 |
| 4,007,952 | A | * | 2/1977 | Fiddler ....................... 285/124.3 |
| 4,319,774 | A | * | 3/1982 | Kavick .......................... 285/256 |
| 4,369,992 | A | | 1/1983 | Fournier et al. |
| 4,498,691 | A | | 2/1985 | Cooke |
| 4,691,550 | A | | 9/1987 | Dietzel |
| 4,736,969 | A | | 4/1988 | Fouts |
| 4,804,212 | A | | 2/1989 | Vyse |
| 4,850,619 | A | * | 7/1989 | Lantos et al. ............... 285/222.4 |
| 5,044,671 | A | * | 9/1991 | Chisnell et al. .................. 285/55 |
| 5,417,461 | A | | 5/1995 | Dougherty et al. |
| 6,394,506 | B1 | | 5/2002 | Street |
| 6,421,905 | B1 | * | 7/2002 | Feher ............................. 29/516 |
| 6,860,520 | B2 | | 3/2005 | Schwab |

FOREIGN PATENT DOCUMENTS

| EP | 1265018 A1 | 12/2002 |
| EP | 1882876 A1 | 1/2008 |
| GB | 1467066 A | 3/1977 |

OTHER PUBLICATIONS

International Search Report, PCT/IB2011/000520, Dated Aug. 23, 2011.

* cited by examiner

*Primary Examiner* — Aaron Dunwoody

(74) *Attorney, Agent, or Firm* — Rader, Fishman & Grauer PLLC

(57) ABSTRACT

A hose coupling assembly is described that includes a nipple section for retaining a flexible hose where the hose is crimped between the nipple section and a socket. A tubular sleeve covers a portion of the nipple section known as the nipple extension section and the sleeve is attached to the nipple section so as to cover at least one aperture formed in the nipple section such that the sleeve is forced outward towards the socket when pressurized fluid is introduced into the hose coupling assembly which increases the compression force on the hose.

22 Claims, 3 Drawing Sheets

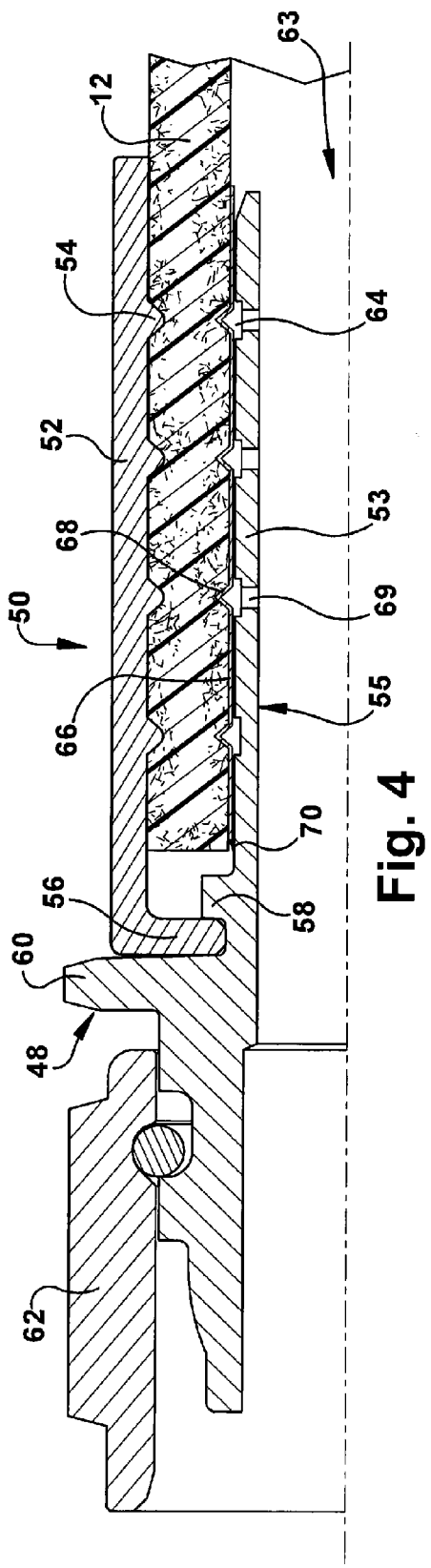
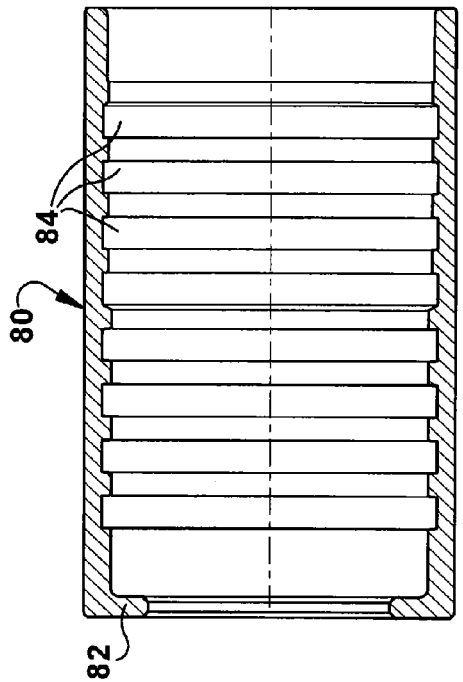
Fig. 4
Fig. 5
Fig. 6

HOSE COUPLING

BACKGROUND INFORMATION

The prior art includes many examples of flexible hose coupling devices that employ a barbed nipple and a socket where the hose is clamped with a crush (compression) force between the nipple and the socket. The crush force is typically generated by crimping the socket down onto the outside of the hose where it is trapped between the socket and the barbed nipple. U.S. Pat. No. 4,804,212 to Vyse discloses a device to crimp the socket onto a hose and nipple. The nipple has a central passageway for the flow of hydraulic fluid there through. The nipple is then connected to some type of hydraulic device such as a valve or pump, etc. The hose is retained on the nipple by the crush force between the socket and the nipple which is generated as the socket is crimped so as to trap the hose between the nipple and the socket. At higher pressures, this connection between the couple device (fitting) and the hose may begin to leak and there may even be complete separation between the hose and the fitting at high pressures. U.S. Pat. No. 5,417,461 to Dougherty et al. discloses an alternate retention mechanism to the barbs on the nipple, where there are ridges formed on the outside of the nipple and the socket is rolled to compress the hose onto the ridges.

The crush or compression force on the hose between the socket and the nipple remains at a maximum as it was generated upon assembly when the socket was crimped. This compression force level may decrease slightly with time and upon the introduction of high pressure hydraulic fluid. The pressurized hydraulic fluid is tending to blow the hose off of the fitting and the retention forces generated by the socket crush and the barbs on the nipple must prevent the hose from leaking or separating from the nipple. This prevents the hose and fitting assembly from being used in applications where the hydraulic fluid pressure might exceed the recommended level. In these applications, more expensive fluid conveyance systems must be used such as more sophisticated hose fittings or even hard tubing. It would be desirable to employ a hose retention system that would allow the flexible hose and socket/nipple fitting to be used at higher pressures without leakage or separation. However, none of the prior art references disclose using a device that uses the working hydraulic fluid pressure to maintain or increase the compressive force on the hose for improved retention and improved sealing at higher pressures.

Due to an increasing demand for traditional hose coupling assemblies to operate without leakage, particularly in high pressure fluid systems or in systems that carry a working fluid that is difficult to seal against leakage. Accordingly, there continues to be a need for improved hose coupling assemblies that can operate in high performance fluid systems without leakage or failure.

SUMMARY

The exemplary hose coupling assembly is particularly suited for applications requiring the handling of high pressure hydraulic fluids using a flexible hose and a hose coupling without leakage and without separation of the hose from the coupling. The present exemplary coupling provides for higher pressure applications of a flexible hose and socket/nipple coupling by increasing the compression force on the hose as the hydraulic fluid pressure increases. The exemplary hose coupling assembly makes use of the working hydraulic fluid pressure to force a sleeve outward towards the hose as the pressure of the fluid is increased by increasing the compression forces on the hose. This prevents leakage and retains the hose in the coupling at higher operating pressures. The sleeve is mounted so as to surround an extension section of the nipple and is positioned between the nipple and the hose. The sleeve structure is designed to allow the sleeve to either expand or otherwise move upward toward the inner surface of the hose as the hydraulic pressure is increased beyond a given level thereby increasing the crush force on the hose and retaining it in position in the coupling at higher pressures. Various configurations are contemplated depending on the characteristics of the hose and the needed features of the coupling while the preferred embodiment is disclosed in this application. Various materials and structures can be used to generate this effect within the metes and bounds of this application.

The sleeve is shown positioned proximate one end of the nipple at the nipple extension and extends axially inward towards a second end of the nipple. Apertures formed in the nipple under the sleeve permit working hydraulic fluid to apply pressure against the underside of the sleeve and force it outward toward the inside of the hose. Captured between the sleeve and the socket, the crush force on the hose increases as the working fluid pressure is increased. The sleeve is attached and sealed to the nipple by a circumferential weld at the end of the sleeve opposite the open end of the nipple extension. This ensures that there will be a pressure differential between the inner and outer surfaces of the sleeve when working pressure is increased. In an alternative embodiment, the sleeve is attached at both ends to the sleeve.

The nipple assembly includes at least one barb or other type of ridge extending from its outer surface and includes some type of retention system to hold the socket in place on the nipple such as a groove formed on the body of the nipple. For some applications, there are no barbs or ridges on the nipple but there are ridges or grooves formed in the inner surface of the socket. See U.S. Pat. No. 4,498,691 for a description of retention ridges formed in the socket. At an end of the nipple opposite the hose end, some type of fitting such as an internally threaded nut can be used to join the coupling to another device such as a motor or cylinder or valve. The socket is mounted onto the nipple and covers the barbed portion and the extension of the nipple and includes at least one portion that is crimped towards the nipple upon assembly of the hose onto the fitting. The die used in the crimping operation is shaped to generate a crush pattern on the socket that provides for maximizing the retention force on the hose while not damaging the hose internal structure due to an excessive crush force. U.S. Pat. No. 4,804,212 to Vyse, discloses such a die crimping device and how this operation can be accomplished.

Thus, the exemplary coupling provides for dynamically increasing the crush force on the hose as the pressure increases using the working hydraulic fluid to push a sleeve upward towards the socket. In this manner, the operational pressures of the fitting and hose assembly of the exemplary dynamic compression hose fitting system can be increased within the required safety margins.

BRIEF DESCRIPTION OF THE DRAWINGS

Embodiments of the exemplary dynamic compression hose assembly will now be described, by way of example, with reference to the accompanying drawings, wherein:

FIG. 4 is a partial perspective view of an alternate embodiment of the exemplary hose coupling assembly;

FIG. 5 is a perspective view of the sleeve shown in FIG. 4; and

FIG. 6 is a partial cross-sectional view of an alternate embodiment of the socket of the exemplary hose coupling assembly.

DETAILED DESCRIPTION

Figure 1:
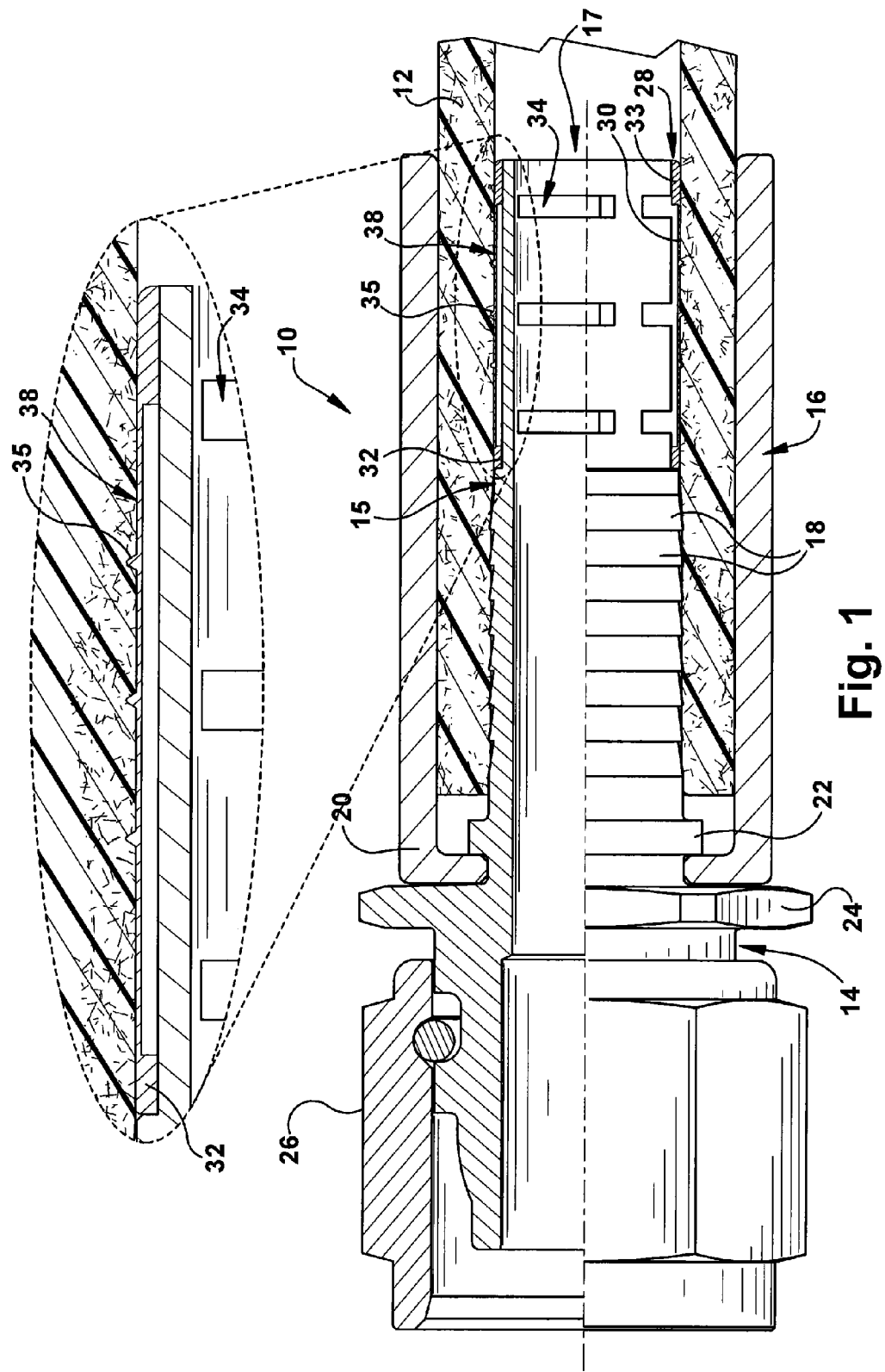
FIG. 1 is a cross-sectional view of the exemplary hose coupling assembly.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Moreover, a number of constants may be introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

Now referring to FIG. 1 of the drawings, a cross-sectional view of the exemplary hose coupling assembly 10 is shown. The hose coupling assembly 10 includes both the high pressure hydraulic hose 12 which is joined to the barbed hose coupling 14 of the hose coupling assembly 10. The hose coupling 14 is new and unique and includes a socket 16 which is crimped after insertion of the hose 12 so that the hose is crushed between the socket 16 and the retention barbs 18 formed on the outer surface of the nipple section 15 of the hose coupling 14. For purposes of this disclosure, the barbs 18 encompass all types of shapes formed on a surface that function to grip the hose 12 and provide for increased retention. The socket 16 has a formed socket base 20 which engages a groove formed between a socket retainer 22 and a hex shoulder 24 formed as parts of the hose coupling 14.

At an end of the hose coupling 14 is a threaded connector 26 which is joined, for example, to another hydraulic device such as a valve, pump or motor or cylinder.

Figure 2:
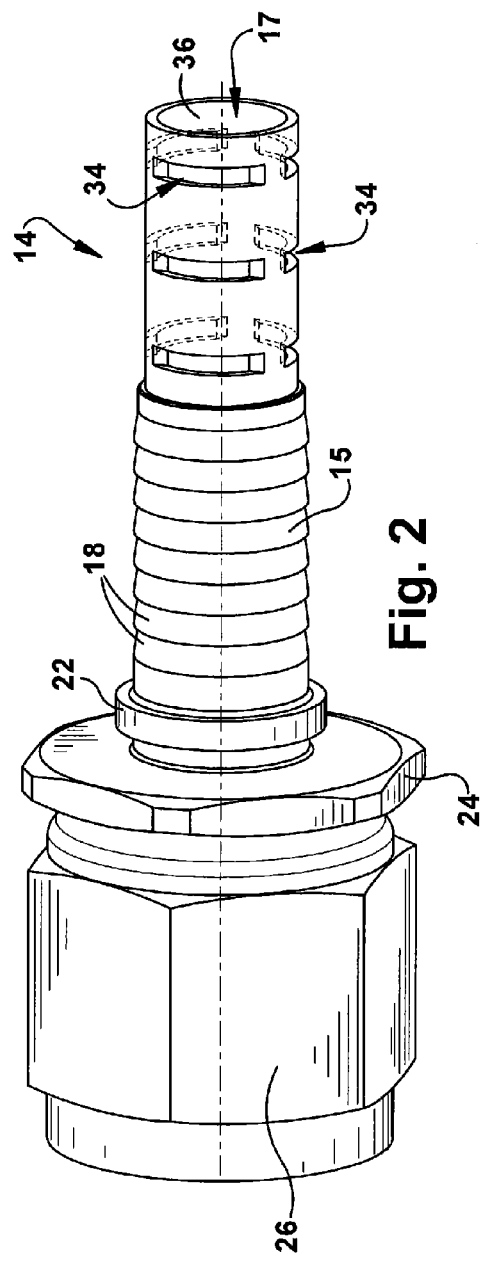
FIG. 2 is a perspective view of the exemplary nipple assembly of the exemplary hose coupling assembly.

At the end of the hose coupling 14 opposite the threaded connector 26 is a sleeve assembly 28 which overlaps an end portion of the nipple section 15 identified as a nipple extension section 36 (see FIG. 2). The sleeve assembly 28 consists of a relatively thin walled tubular sleeve 30 which is supported on an inner sleeve ring 32 and an outer sleeve ring 33 which are positioned on the nipple extension section 36. For purposes of this disclosure, the nipple section 15 can be construed to include the nipple extension section 36. The first end of the sleeve 30 is attached to the nipple extension section 36 adjacent to the nipple section 15. The inner and outer sleeve rings 32, 33 can be formed as part of the sleeve 30 or either the inner sleeve ring 32 and/or the outer sleeve ring 33 can be omitted and the sleeve can lie directly against the nipple extension section 36 (see FIG. 4). The inner and/or outer sleeve rings 32, 33 can be formed as part of the sleeve 30 or can be separately made and then attached to the sleeve 30 using a known attachment process such as welding. The sleeve assembly 28 is then welded or otherwise attached to the nipple extension section 36 at only one end or at both ends of the sleeve assembly 28. Shown in FIG. 1 is the embodiment where the sleeve 30 is attached to the nipple extension section 36 at the inner sleeve ring 32 by a circumferential weld to hold and seal the sleeve assembly 28 to the nipple extension section 36. The hose coupling (fitting) 14 can be made of stainless steel or some other suitable material such as mild steel or brass.

Under the sleeve assembly 28 between the inner and outer sleeve rings 32, 33 are apertures 34 formed in the nipple section 15 at the nipple extension section 36. The pressurized hydraulic fluid flowing through axial cavity 17 in the hose coupling 14 is allowed to flow from the axial cavity 17 outward and into the cavity 38 formed between the sleeve 30 and the nipple extension section 36 and between the inner and outer sleeve rings 32, 33. In the preferred embodiment, the sleeve 30 is supported on an inner sleeve ring 32 and an outer sleeve ring 33 and the sleeve 30 is attached to the nipple extension section 36 at the end of the sleeve 30 adjacent to the nipple section 15. When the pressure of the hydraulic fluid is of a sufficiently high magnitude, the sleeve 30 is forced outward away from the nipple extension section 36. This increases the crush force on the hose 12 as the hydraulic pressure is increased. Also, assisting the retention of the hose are sleeve barbs 35 formed on the outside surface of the sleeve 30. This action provides for additional overall retention forces on the hose 12 and sealing between the sleeve 30 and the hose 12 so that it remains connected to the hose coupling 14 even at higher pressures.

Now referring to FIG. 2 of the drawings, a plan view of the hose coupling 14 of the exemplary hose coupling assembly 10 is shown. More clearly shown is at least one aperture 34 formed in the nipple extension section 36 which provide a path for the hydraulic fluid to flow from the inside of the hose coupling 14 outward from the axial cavity 17 to the cavity 38 formed by the sleeve 30 and the inner and outer sleeve rings 32, 33 at least one of which can be attached to the nipple extension section 36. The sleeve 30 can be attached to the nipple extension section 36 at either end or at both ends. In FIG. 1, the sleeve 30 is shown attached at the inner end at the inner sleeve ring 32 to the nipple extension section 36 of the nipple section 15. The pressurized hydraulic fluid flowing in the axial cavity 17 flows outward through the apertures 34 and is applied against the inner surface of the sleeve 30 which deflects the sleeve 30 outward thereby increasing the compression force on the hose 12. The barbs 18 formed on the outside of the nipple section 15 engages the hose 12 in a known manner to help retain the hose 12 onto the nipple section 15 especially after the socket 16 (see FIG. 1) is crimped. The threaded connector 26 can be any type of suitable connection device which functions to join the hose coupling 14 to another device such as a valve, pump, motor or cylinder, etc. The coupling device shown is an internally threaded connector 26 having a hex nut shape for tightening.

Figure 3:
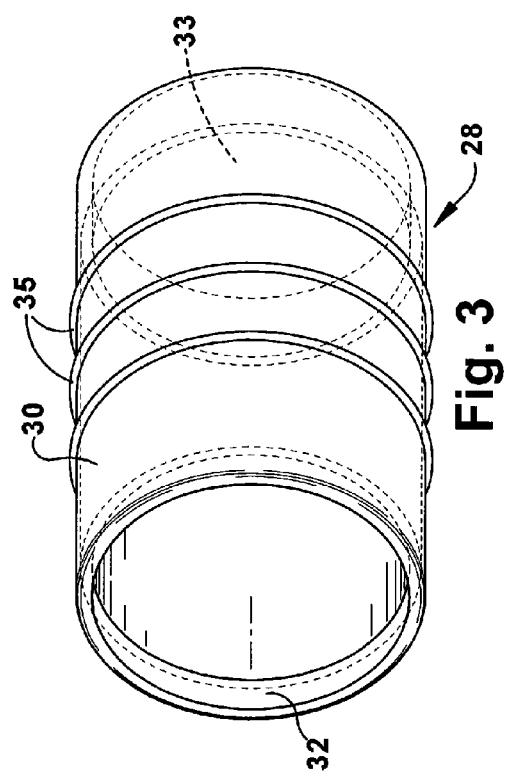
FIG. 3 is a perspective view of the exemplary sleeve of the exemplary coupling assembly.

Now referring to FIG. 3 of the drawings a perspective view of the sleeve assembly 28 of the exemplary hose assembly 10 is shown. As an example, for a −4 size fitting, the sleeve assembly 28 consists of a relatively thin wall sleeve 30 which is about 0.010 inches thick and 0.75 inches long with a diameter of 0.412 inches. Example candidate materials for the sleeve 30 include stainless steel and titanium. The material for the sleeve 30 must be chosen to provide the required elasticity to deflect under a chosen level of hydraulic pressure if the sleeve 30 is attached at either end of the sleeve 30 or at both ends to the nipple section 15. As the hydraulic pressure is increased, the sleeve 30 will "breathe" or tend to expand outward. In this manner, the sleeve 30 will deflect outward and provide an increase in the compression force on the hose 12 without exceeding the elastic limits of the sleeve 30 so that it does not fail. An acceptable material for the sleeve 30 is stainless steel although many other suitable materials could be used depending on the needs of the application.

The inner and outer sleeve rings 32, 33 can be of the same or similar dimensions or they can be custom shaped and sized to provide the required support function to the sleeve 30. In the alternative, only one sleeve need be used or in another alternative embodiment, no sleeve rings need to be used and the sleeve 30 can be directly attached to the nipple section 14 at the nipple extension section 36 at either one end or at both ends of the sleeve 30 by welding or other attachment method. The inner and/or outer sleeve rings 32, 33 can be formed as part of the sleeve 30 or either can be separately made and then attached to the sleeve 30 and to the nipple extension section 36 using known techniques such as welding or adhesive bonding or a mechanical attachment method may be used such as staking or using a thread attachment system.

At least one sleeve barb 35 is formed on the outer surface of the sleeve 30 although any type of known shape can be formed on the outside of the sleeve 30 to provide a retention action on the hose 12. For example, ridges or grooves could be formed on the outside of the sleeve 30. Likewise, ridges and/or grooves could be formed in the inner wall of the socket 30 (see FIG. 6) and on the outer surface of the nipple section 15 in lieu of barbs 18.

Now referring to FIG. 4 of the drawings, a partial cross-sectional view of an alternate embodiment of the exemplary hose coupling assembly 50 is shown which includes a hose 12 and a hose coupling 48. The hose 12 is shown trapped between a socket 52 and a nipple section 53 of the nipple assembly 55. As the socket 52 is crimped, a compression or crush force is applied to the hose 12 thereby retaining the hose 12 in the hose coupling 48. Socket barbs 54 are formed on the inner surface of the socket 52 and bite into the hose 12 when the socket 52 is crimped. The socket 52 is held on the nipple assembly 55 at a socket base 56 that is trapped between an annular socket retainer 58 and an annular flange 60 where the flange 60 is flatted for holding with a wrench during tightening of the fitting 62 when it is joined to another hydraulic device such as a valve or pump, etc. A plurality of annular grooves 64 are formed in the nipple 53 to allow the working hydraulic fluid to be transported from the central axial cavity 63 in the nipple 53 outward through a plurality of apertures 69 formed in the nipple 53. A tubular sleeve 66 is positioned over the nipple 53 and attached to the nipple 53 with attachment 70. Attachment 70 can be a circumferential weld or an adhesive bond or any other suitable attachment method. A number of sleeve barbs 68 extend from the outer surface of the sleeve 66 outward towards the hose 12 and bite into the hose 12 when the socket 52 is crimped and when hydraulic fluid pressure is applied to the underside of the sleeve 66 when the moves under pressure from the central axial cavity 63 of the nipple 53 through the apertures 69 into nipple grooves 64.

Now referring to FIG. 5 of the drawings, a perspective view of the tubular shaped sleeve 66 is shown along with the sleeve barbs 68 formed in the outer surface of the sleeve 66. In this embodiment the sleeve 66 can be made of a stainless steel or titanium material and cleaned using a passivation or other cleaning or treatment process to provide the desirable material properties. The sleeve 66 is attached to the nipple section 53. It is also possible to also weld or otherwise attach both the inner and outer ends of the sleeve 52 to the nipple 53. This would allow the sleeve 66 to deflect upward towards the hose 12 but greater hydraulic pressures would be required as compared to the configuration using only one attachment 70. It is also contemplated that inner and/or outer sleeve rings 32, 33 could be used as shown in FIG. 1.

Now referring to FIG. 6 of the drawings, a partial perspective view of an alternative embodiment of a socket 80 is shown. This particular socket 80 could be used in the hose couplings 14, 48 of either FIG. 1 or that shown in FIG. 5 respectively. The socket base 82 is used to retain the socket 80 to a nipple assembly. Radial grooves 84 are formed in the inner surface of the socket 80 which bite into the hose 12 and provide an increased level of retention, especially when the socket 52 is crimped at the time of assembly.

This disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

What is claimed is:

1. A hose assembly comprising:
   a hose for conveyance of a pressurized fluid;
   a hose coupling joined to said hose, said hose coupling having a nipple section, said nipple section contacting said hose and joined to a nipple extension section, said nipple extension section having at least one aperture extending from a central axial cavity formed in said hose coupling to an outer surface of said nipple extension section;
   a sleeve assembly having a sleeve and at least two axially spaced sleeve rings mounted on an inner surface of said sleeve, said sleeve assembly substantially covering said nipple extension section at said outer surface and covering said at least one aperture, wherein said sleeve rings radially separate said sleeve from said nipple extension section to define a cavity between said inner surface of said sleeve and said outer surface of said nipple extension section; and
   a socket supported on said hose coupling, said socket being crimped onto said hose.

2. The hose assembly of claim 1, wherein said sleeve rings directly attached to said nipple extension section includes an inner sleeve ring adjacent to said nipple section and an axially outer sleeve ring adjacent to an inlet of said nipple extension section.

3. The hose assembly of claim 2, wherein said inner sleeve ring adjacent to said nipple section is attached to said nipple extension section.

4. The hose assembly of claim 1, wherein said respective sleeve rings are attached to said nipple extension section using a circumferential weld.

5. The hose assembly of claim of claim 1 further comprising at least one barb formed on an outer surface of said sleeve assembly.

6. The hose coupling assembly of claim 5 wherein said sleeve assembly is attached to said nipple section using a circumferential weld at an inner end of said sleeve.

7. The hose coupling assembly of claim 5 wherein said sleeve assembly is attached to said nipple section with an adhesive.

8. The hose assembly of claim 1 wherein the sleeve is a single-walled sleeve.

9. A hose coupling assembly comprising:
a nipple assembly having an axial cavity formed therein and having a nipple section and a connector fitting and a socket mounted adjoining said nipple section;
a hose pressed onto and substantially overlying said nipple section;
at least one aperture formed in said nipple section extending from said axial cavity to an outer surface of said nipple section; and
a tubular sleeve positioned on a portion of said nipple section so as to cover said at least one aperture, said sleeve including at least one radial barb on an outer surface to engage said hose,
wherein said socket is compressed against said hose thereby crushing said hose between said socket and said nipple section and said sleeve.

10. The hose coupling of claim 9, wherein said sleeve is attached to said nipple section at one end of said sleeve.

11. The hose coupling of claim 9 wherein said sleeve is attached to said nipple section at both an inner end and an outer end of said sleeve.

12. The hose coupling of claim 9, further comprising at least two axially spaced sleeve rings attached to an inner surface of said sleeve, said sleeve rings supporting said sleeve on said nipple section to define a radial cavity between said inner surface of said sleeve and said outer surface of said nipple section.

13. The hose coupling of claim 12, wherein said at least one sleeve ring is attached to said nipple section.

14. The hose coupling of claim 13 wherein said sleeve ring is attached to said nipple section by welding.

15. The hose coupling of claim 13 wherein said sleeve ring is attached to said nipple section with an adhesive.

16. The hose coupling assembly of claim 9 wherein the sleeve is a single-walled sleeve.

17. A hose coupling comprising:
a nipple assembly having a nipple section for engaging a hose, said nipple section having an axial inlet and defining an axial cavity;
a socket mounted on said nipple assembly adjacent to said nipple section;
at least one aperture formed in said nipple section extending from said axial cavity outwardly to an outer surface of said nipple section;
a tubular sleeve positioned on said nipple section extending axially inwards from said axial inlet of said nipple section so as to cover said at least one aperture, said sleeve including at least one radial barb projecting from an outer surface.

18. The hose coupling of claim 17 wherein said sleeve is supported on said nipple section.

19. The hose coupling of claim 17, further comprising at least two axially spaced sleeve rings attached to an inner surface of said sleeve, wherein said sleeve rings radially separate said sleeve from said nipple section to define a cavity between said inner surface of said sleeve and said outer surface of said nipple section.

20. The hose coupling of claim 19, wherein at least one sleeve ring is attached to said nipple section.

21. The hose coupling of claim 17 further comprising a hydraulic hose pressed onto said nipple section and over said sleeve.

22. The hose coupling of claim 17 wherein the sleeve is a single-walled sleeve.

* * * * *

UNITED STATES PATENT AND TRADEMARK OFFICE
CERTIFICATE OF CORRECTION

PATENT NO. : 8,888,138 B2  
APPLICATION NO. : 12/724201  
DATED : November 18, 2014  
INVENTOR(S) : Lefere Page 1 of 1

It is certified that error appears in the above-identified patent and that said Letters Patent is hereby corrected as shown below:

In the Claims

At column 6, claim 2, line 54, the words "directly attached to said nipple extension section" should be deleted.

The claim should read, "wherein said sleeve rings includes..."

Signed and Sealed this  
Twenty-fourth Day of March, 2015

Michelle K. Lee  
*Director of the United States Patent and Trademark Office*